United States Patent
Leong et al.

(10) Patent No.: US 10,424,446 B2
(45) Date of Patent: Sep. 24, 2019

(54) KEYBOARD ASSEMBLIES HAVING REDUCED THICKNESS AND METHOD OF FORMING KEYBOARD ASSEMBLIES

(71) Applicant: Apple Inc., Cupertino, CA (US)

(72) Inventors: Craig C. Leong, Cupertino, CA (US); Bradford J. Zercoe, Cupertino, CA (US); Thai Q. La, Cupertino, CA (US); Robert Y. Cao, Cupertino, CA (US); Alex J. Lehmann, Cupertino, CA (US); Dinesh C. Mathew, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 102 days.

(21) Appl. No.: 15/154,682

(22) Filed: May 13, 2016

(65) Prior Publication Data

US 2016/0336128 A1 Nov. 17, 2016

Related U.S. Application Data

(60) Provisional application No. 62/161,020, filed on May 13, 2015.

(51) Int. Cl.
*H01H 13/7065* (2006.01)
*H01H 13/702* (2006.01)
(Continued)

(52) U.S. Cl.
CPC ....... *H01H 13/7065* (2013.01); *G06F 1/1662* (2013.01); *H01H 13/10* (2013.01);
(Continued)

(58) Field of Classification Search
CPC ............ H01H 3/125; H01H 2203/028; H01H 2205/026; H01H 2215/006;
(Continued)

(56) References Cited

U.S. PATENT DOCUMENTS

| 3,657,492 A | 4/1972 | Arndt et al. |
|---|---|---|
| 3,917,917 A | 11/1975 | Murata |

(Continued)

FOREIGN PATENT DOCUMENTS

| CN | 2155620 | 2/1994 |
|---|---|---|
| CN | 2394309 | 8/2000 |

(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

(Continued)

*Primary Examiner* — Anthony R Jimenez
(74) *Attorney, Agent, or Firm* — Dorsey & Whitney LLP

(57) ABSTRACT

Keyboard assemblies having reduced thicknesses and methods of forming the same. A keyboard assembly may include a printed circuit board (PCB) and a single membrane sheet adhered directly to the PCB. The single membrane sheet may substantially cover the PCB. The keyboard assembly may also include a group of dome switches coupled directly to the single membrane sheet. Another keyboard assembly may include a group of conductive pads and a group of membrane pads. Each of the group of membrane pads may be adhered directly to a corresponding one of the group of conductive pads. The keyboard assembly may also include a group of dome switches coupled directly to the membrane pads. Each of the group of dome switches may be coupled directly to a corresponding one of the group of membrane pads.

17 Claims, 10 Drawing Sheets

(51) Int. Cl.
*H01H 13/10* (2006.01)
*H01H 13/807* (2006.01)
*H01H 13/88* (2006.01)
*G06F 1/16* (2006.01)
*H01H 3/12* (2006.01)

(52) U.S. Cl.
CPC ........ *H01H 13/702* (2013.01); *H01H 13/807* (2013.01); *H01H 13/88* (2013.01); *H01H 3/125* (2013.01); *H01H 2203/028* (2013.01); *H01H 2205/026* (2013.01); *H01H 2215/006* (2013.01); *H01H 2231/002* (2013.01)

(58) Field of Classification Search
CPC ......... H01H 2231/002; H01H 13/7065; H01H 13/10; H01H 13/702; H01H 13/807; H01H 13/88; G06F 1/1662
USPC ........ 200/5 A, 402, 406, 512, 513, 511, 520
See application file for complete search history.

(56) References Cited

U.S. PATENT DOCUMENTS

| | | | |
|---|---|---|---|
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A * | 6/1986 | Fowler | H01H 13/702 200/306 |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A * | 1/1991 | Miller | H01H 13/702 200/275 |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,875,013 A | 2/1999 | Takahara |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzaiski et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,738,050 B2 | 5/2004 | Comiskey |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,926,418 B2 | 8/2005 | Ostergård et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 7,012,206 B2 | 3/2006 | Oikawa |
| 7,030,330 B2 | 4/2006 | Suda |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,790 B2 * | 12/2007 | Sato | G06F 1/1626 178/18.01 |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,679,010 B2 | 3/2010 | Wingett |
| 7,687,735 B2 * | 3/2010 | Chien | H01H 13/705 200/406 |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |

(56) References Cited

U.S. PATENT DOCUMENTS

| | | |
|---|---|---|
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,513,549 B2 * | 8/2013 | Chen .................... G06F 3/0202 200/5 A |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,734,965 B2 | 8/2017 | Martinez et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0160669 A1 * | 8/2003 | Trandafir ............ H01H 13/702 335/78 |
| 2003/0169232 A1 | 9/2003 | Ito |
| 2004/0004559 A1 | 1/2004 | Rast |
| 2004/0031673 A1 * | 2/2004 | Levy .................... H01H 13/702 200/521 |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0089011 A1 * | 4/2011 | Ozaki .................... H01H 13/83 200/512 |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2013/0328785 A1 * | 12/2013 | Brooks ................ G06F 1/1658 345/170 |
| 2014/0015777 A1 | 1/2014 | Park et al. |
| 2014/0027259 A1 | 1/2014 | Kawana et al. |

(56) References Cited

U.S. PATENT DOCUMENTS

| | | | |
|---|---|---|---|
| 2014/0071654 | A1 | 3/2014 | Chien |
| 2014/0082490 | A1 | 3/2014 | Jung et al. |
| 2014/0090967 | A1 | 4/2014 | Inagaki |
| 2014/0098042 | A1 | 4/2014 | Kuo et al. |
| 2014/0118264 | A1 | 5/2014 | Leong et al. |
| 2014/0151211 | A1 | 6/2014 | Zhang |
| 2014/0184496 | A1 | 7/2014 | Gribetz et al. |
| 2014/0191973 | A1 | 7/2014 | Zellers et al. |
| 2014/0218851 | A1 | 8/2014 | Klein et al. |
| 2014/0252881 | A1 | 9/2014 | Dinh et al. |
| 2014/0291133 | A1 | 10/2014 | Fu et al. |
| 2014/0375141 | A1 | 12/2014 | Nakajima |
| 2015/0016038 | A1 | 1/2015 | Niu et al. |
| 2015/0083561 | A1 | 3/2015 | Han et al. |
| 2015/0090570 | A1 | 4/2015 | Kwan et al. |
| 2015/0090571 | A1 | 4/2015 | Leong et al. |
| 2015/0270073 | A1 | 9/2015 | Yarak, III et al. |
| 2015/0277559 | A1 | 10/2015 | Vescovi et al. |
| 2015/0287553 | A1 | 10/2015 | Welch et al. |
| 2015/0309538 | A1 | 10/2015 | Zhang |
| 2015/0332874 | A1 | 11/2015 | Brock et al. |
| 2015/0348726 | A1 | 12/2015 | Hendren |
| 2015/0370339 | A1 | 12/2015 | Ligtenberg et al. |
| 2015/0378391 | A1 | 12/2015 | Huitema et al. |
| 2016/0049266 | A1 | 2/2016 | Stringer et al. |
| 2016/0093452 | A1 | 3/2016 | Zercoe et al. |
| 2016/0172129 | A1 | 6/2016 | Zercoe et al. |
| 2016/0189890 | A1 | 6/2016 | Leong et al. |
| 2016/0189891 | A1 | 6/2016 | Zercoe et al. |
| 2016/0259375 | A1 | 9/2016 | Andre et al. |
| 2016/0329166 | A1 | 11/2016 | Hou et al. |
| 2016/0336124 | A1 | 11/2016 | Leong et al. |
| 2016/0336127 | A1 | 11/2016 | Leong et al. |
| 2016/0343523 | A1 | 11/2016 | Hendren et al. |
| 2016/0351360 | A1 | 12/2016 | Knopf et al. |
| 2016/0365204 | A1 | 12/2016 | Cao et al. |
| 2016/0378234 | A1 | 12/2016 | Ligtenberg et al. |
| 2016/0379775 | A1 | 12/2016 | Leong et al. |
| 2017/0004937 | A1 | 1/2017 | Leong et al. |
| 2017/0004939 | A1 | 1/2017 | Kwan et al. |
| 2017/0011869 | A1 | 1/2017 | Knopf et al. |
| 2017/0090106 | A1 | 3/2017 | Cao et al. |
| 2017/0301487 | A1 | 10/2017 | Leong et al. |
| 2017/0315624 | A1 | 11/2017 | Leong et al. |
| 2018/0029339 | A1 | 2/2018 | Liu et al. |
| 2018/0040441 | A1 | 2/2018 | Wu et al. |
| 2018/0074694 | A1 | 3/2018 | Lehmann et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |

(56) References Cited

FOREIGN PATENT DOCUMENTS

| | | |
|---|---|---|
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

International Search Report and Written Opinion, PCT/US2016/032472, 12 pages, Aug. 4, 2016.
U.S. Appl. No. 14/472,260, filed Aug. 28, 2014, pending.
U.S. Appl. No. 14/501,680, filed Sep. 30, 2014, pending.
U.S. Appl. No. 15/014,596, filed Feb. 3, 2016, pending.
U.S. Appl. No. 15/230,724, filed Aug. 8, 2016, pending.
U.S. Appl. No. 15/261,972, filed Sep. 11, 2016, pending; and.
U.S. Appl. No. 15/342,715, filed Nov. 3, 2016, pending.

\* cited by examiner

US 10,424,446 B2

KEYBOARD ASSEMBLIES HAVING REDUCED THICKNESS AND METHOD OF FORMING KEYBOARD ASSEMBLIES

CROSS-REFERENCE TO RELATED APPLICATION(S)

This application is a nonprovisional patent application of and claims the benefit of U.S. Provisional Patent Application No. 62/161,020, filed May 13, 2015 and titled "Keyboard Assemblies Having Reduced Thicknesses and Method of Forming Keyboard Assemblies," the disclosure of which is hereby incorporated herein by reference in its entirety.

FIELD

The disclosure relates generally to input devices for electronic devices, and more particularly to keyboard assemblies having reduced thicknesses.

BACKGROUND

It is becoming more and more desirable within the industry to reduce the size and/or thickness of various electronic devices. As such, all components of an electronic device, including any keyboard assembly, may be reduced in size. As a result, the size and/or number of components of the keyboard likewise may be reduced. With a reduction in size, quantity and/or material used to form the various components, the strength, and ultimately the operational life of the component may be reduced. This may cause the operational life of the keyboard assembly and/or electronic device to be reduced as well.

SUMMARY

Generally, embodiments discussed herein are related to keyboard assemblies having reduced thicknesses. In a keyboard assembly, a dome switch may be disposed, coupled and/or affixed directly to a membrane layer of the keyboard assembly stack-up. Additionally, the membrane layer may be adhered directly to a printed circuit board (PCB) of the keyboard assembly stack-up. When compressed, the dome switch, membrane layer and PCB may all be in electrical connection and/or may cooperate to transmit or generate an electrical signal (e.g., input) for the keyboard assembly and/or electronic device utilizing the keyboard assembly.

The membrane layer may be a single component that substantially covers and/or is disposed over the PCB layer, and the various dome switches of the keyboard assembly may be disposed, coupled and/or affixed directly to distinct portions of the single membrane layer. Alternatively, each individual dome switch for each individual key assembly of the keyboard may be disposed, coupled and/or affixed directly to a corresponding membrane pad. The membrane pads may be adhered to a PCB layer or a corresponding conductive pad of the keyboard assembly stack-up.

By adhering a dome switch directly to the membrane layer and/or the membrane pad, and also adhering the membrane layer/pad(s) to the PCB, the overall size and/or thickness of the stack-up for the keyboard assembly may be reduced. Additionally, by coupling the dome switch directly to the membrane layer/pad, the dome switch may be more easily implemented, secured and/or installed in the stack-up of the keyboard assembly, which may reduce assembly time for the keyboard assembly.

One embodiment may take the form of an electronic device. The electronic device may comprise a casing, and a keyboard assembly housed at least partially within the casing. The keyboard assembly may comprise a printed circuit board (PCB) positioned within the casing, a membrane layer affixed directly to the PCB, and a dome switch coupled directly to the membrane layer.

Another embodiment may take the form of a keyboard assembly comprising a printed circuit board (PCB), and a single membrane sheet adhered directly to and substantially covering the PCB. The keyboard assembly may also comprise a group of dome switches coupled directly to the single membrane sheet.

An additional embodiment may take the form of a keyboard assembly comprising a group of printed circuit board (PCB) pads, and a group of membrane pads. Each of the group of membrane pads may be adhered directly to a corresponding one of the group of conductive pad. The keyboard assembly may also comprise a group of dome switches. Each of the group of dome switches may be coupled directly to a corresponding one of the group of membrane pads.

A further embodiment may take the form of a method for assembling a keyboard. The method may comprise coupling a dome switch directly to a membrane layer, adhering the membrane layer directly to a printed circuit board (PCB), and positioning a switch housing over the PCB to substantially surround the dome switch. The method may also comprise coupling a keycap to a hinge mechanism positioned adjacent the switch housing. The keycap may be positioned above the dome switch.

BRIEF DESCRIPTION OF THE DRAWINGS

The disclosure will be readily understood by the following detailed description in conjunction with the accompanying drawings, wherein like reference numerals designate like structural elements, and in which.

Figure 1:
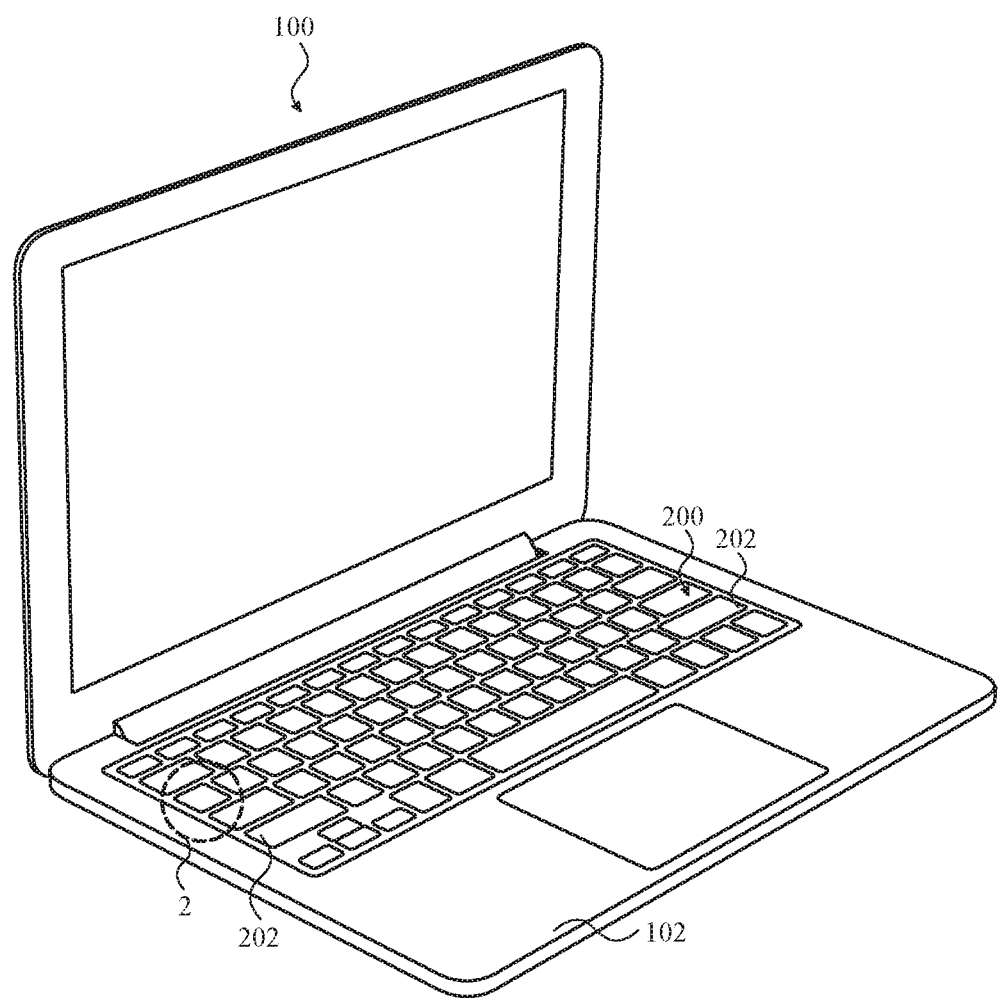
FIG. 1 depicts an illustrative view of an electronic device including a keyboard assembly.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to input devices for electronic devices, and more particularly to keyboard assemblies having reduced thicknesses.

In a keyboard assembly, a dome switch may be disposed, coupled and/or affixed directly to a membrane layer of the keyboard assembly stack-up. Additionally, the membrane layer may be adhered directly to a printed circuit board (PCB) of the keyboard assembly stack-up. When compressed, the dome switch, membrane layer and PCB may all be in electrical connection and/or may cooperate to transmit or generate an electrical signal (e.g., input) for the keyboard assembly and/or electronic device utilizing the keyboard assembly.

The membrane layer may be a single component that substantially covers and/or is disposed over the PCB layer, and the various dome switches of the keyboard assembly may be disposed, coupled and/or affixed directly to distinct portions of the single membrane layer. Alternately, each individual dome switch for each individual key assembly of the keyboard may be disposed, coupled and/or affixed directly to a corresponding membrane pad. The membrane pads may be adhered to a PCB layer or a corresponding conductive pad of the keyboard assembly stack-up.

By affixing a dome switch directly to the membrane layer and/or the membrane pad, and affixing the membrane layer/pad(s) to the PCB, the overall size and/or thickness of the stack-up for the keyboard assembly may be reduced. Additionally, by coupling the dome switch directly to the membrane layer/pad, the dome switch may be more easily implemented, secured and/or installed in the stack-up of the keyboard assembly, which may reduce assembly time for the keyboard assembly.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 shows an illustrative view of an electronic device 100 including a keyboard assembly 200 having a reduced stack-up, and particularly having one or more dome switches directly connected to one or more membrane layers or pads that, in turn, may be connected directly to a printed circuit board. In a non-limiting example, as shown in FIG. 1, electronic device 100 may be a laptop computer. However, it is understood that electronic device 100 may be configured as any suitable electronic device that may utilize keyboard assembly 200. Other embodiments can implement electronic device 100 differently, such as, for example, a desktop computer, a tablet computing device, a smartphone, a gaming device, a display, a digital music player, a wearable computing device or display, a health monitoring device, and so on.

Although discussed herein as a keyboard assembly, it is understood that the disclosed embodiments may be used in a variety of input devices used in various electronic devices. That is, keyboard assembly 200, and the components of the assembly discussed herein, may be utilized or implemented in a variety of input devices for an electronic device including, but not limited to, buttons, switches, toggles, wheels, and the like.

Electronic device 100 may include a top case 102. Top case 102 may take the form of an exterior, protective casing or shell for electronic device 100 and the various internal components (for example, keyboard assembly 200) of electronic device 100. Top case 102 may be formed as a single, integral component or may have a group of distinct components coupled to one another, as discussed herein. Additionally, top case 102 may be formed from any suitable material that provides a protective casing or shell for electronic device 100 and the various components included in electronic device 100. In non-limiting examples, top case 102 may be made from a metal, a ceramic, a rigid plastic or another polymer, a fiber-matrix composite, and so on.

Keyboard assembly 200 may be included within electronic device 100. In a non-limiting example shown in FIG. 1, keyboard assembly 200 may include a set of keycaps 202 positioned within top case 102 of electronic device 100. The set of keycaps 202 may partially protrude from top case 102 and each may be substantially surrounded by top case 102. That is, the set of keycaps 202 of keyboard assembly 200 may extend beyond a surface of top case 102 and may be divided or separated by a portion of top case 102. In the non-limiting example shown in FIG. 1, where electronic device 100 is a laptop computer, keyboard assembly 200 may be positioned within and/or may be received by electronic device 100. Further, keyboard assembly 200 may be a distinct, standalone component, and may be in wired or wireless electronic communication with electronic device 100.

Figure 2:
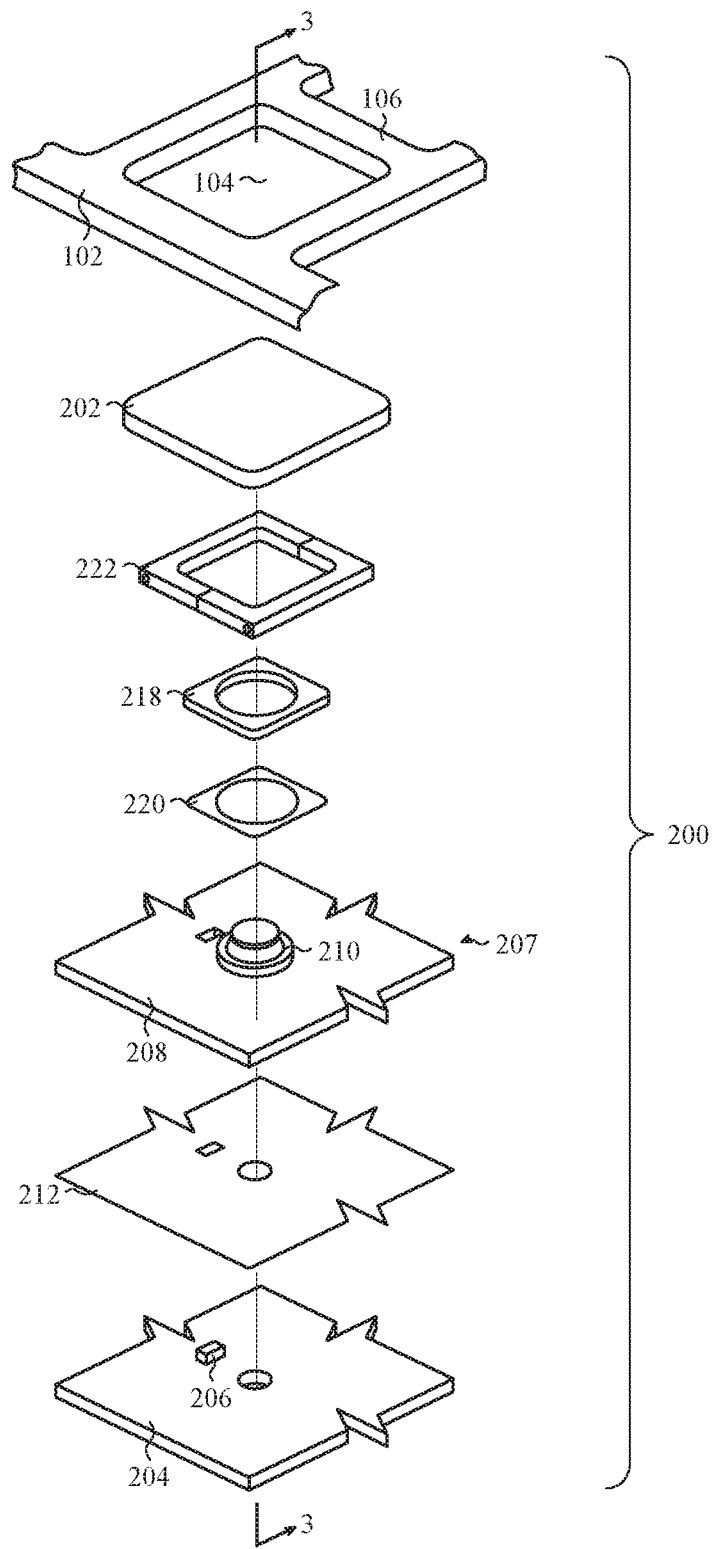
FIG. 2 depicts an illustrative exploded view of a key assembly of the keyboard assembly of FIG. 1.

FIG. 2 depicts an illustrative exploded view of keyboard assembly 200 shown in FIG. 1. Keyboard assembly 200 may be formed from the various layers of components, also referred to as a "stack-up" of layered components. Each layer and/or component of the stack-up of keyboard assembly 200 may provide different functionality and/or operations for electronic device 100 (see, FIG. 1), as discussed herein. Although a single key stack-up of keyboard assembly 200 is shown in FIG. 2, it is understood that substantially all keys of keyboard assembly 200 may be formed from similar components and/or layers in a similar configuration and/or may function in a substantially similar manner as the single key stack-up shown in FIG. 2 and discussed herein.

Keyboard assembly 200 may include a printed circuit board (PCB) 204 positioned below top case 102. PCB 204 may be positioned within electronic device 100 casing formed by top case 102 and a bottom case (not shown in FIG. 2) coupled to top case 102. PCB 204 may be coupled to and/or rest on the bottom case and provide a rigid support structure for the various components forming keyboard assembly 200. PCB 204 may include a set of electrical traces (not shown) formed therein or thereon. The traces may provide an electrical signal (e.g., input) to electronic device 100 when a keycap and/or dome switch is compressed, as discussed herein. PCB 204 may cover and/or may include a geometry substantially equal to the area of keyboard assembly 200 formed or positioned within top case 102 of electronic device 100 (see, FIG. 1).

As shown in FIG. 2, a light source 206 may be positioned on PCB 204. In a non-limiting example, light source 206 couples to and is in electrical communication with PCB 204, such that PCB 204 provides power to illuminate light source 206. As discussed herein, light source 206 may extend from PCB 204 through and/or into distinct layers or components of keyboard assembly 200 for providing light to illuminate keyboard assembly 200 and/or keycap 202. Light source 206 may be formed from any suitable light source configured to illuminate key assembly and/or keycap 202 of keyboard assembly 200. In a non-limiting example, light source 206 may be a light emitting diode (LED) coupled and/or affixed to PCB 204 of keyboard assembly 200.

Keyboard assembly 200 may also include a membrane layer 207. In a non-limiting example shown in FIG. 2, membrane layer 207 may be a single membrane sheet 208 that may substantially cover PCB 204, although in other embodiments the membrane layer may include multiple sheets, films, or the like. Generally, single membrane sheet 208 may have a geometry substantially similar in surface area to PCB 204, such that single membrane sheet 208 covers PCB 204 within the stack-up forming keyboard assembly 200. In a non-limiting example, membrane layer 207 or single membrane sheet 208 may be a sensing membrane that includes at least one trace or sensor positioned on single membrane sheet 208. As discussed herein, traces or sensors positioned on single membrane sheet 208 may be configured to detect or determine when keycap 202 of keyboard assembly 200 is actuated by a user, and subsequently provide an electrical signal (e.g., input) to PCB 204, and ultimately to electronic device 100. In a non-limiting example, single membrane sheet 208 may be formed from a substantially flexible, electrically conductive material including, but not limited to an indium tin oxide (no) layer.

As shown in FIG. 2, a dome switch 210 may be coupled directly to single membrane sheet 208. The dome switch 210 may be laminated, adhered, or otherwise directly affixed to membrane sheet 208. For example, a dome switch 210 may be positioned in or on ultraviolet (UV) glue deposited over single membrane sheet 208, and the UV glue may be subsequently cured to affix dome switch 210 to single membrane sheet 208.

As another example, single membrane sheet 208 and a group of dome switches 210 may be placed on a shaker table, and utilizing the motion or vibration of the shaker table, the group of dome switches may continuously move over single membrane sheet 208 until they are moved into a desired position. In another non-limiting example, a pick-and-place process may be used, where individual dome switches are placed in a desired location on the single membrane sheet 208.

Dome switch 210 may be coupled and/or affixed directly to single membrane sheet 208 to aid in the assembly and/or installation process of single membrane sheet 208 and dome switch 210 within keyboard assembly 200. By coupling dome switch 210 directly to single membrane sheet 208 prior to installing either component within keyboard assembly 200, the dome switch 210 is absolutely affixed to single membrane sheet 208 of keyboard assembly 200. Additionally, coupling dome switch 210 directly to single membrane sheet 208 prior to installation within keyboard assembly 200 simplifies placing the dome switch in a proper position, and eliminates the difficulty of attempting to install dome switch 210 within small spaces such as a switch housing of keyboard assembly 200.

Dome switch 210 may be formed from any suitable material that is substantially flexible, durable and/or elastic. In a non-limiting example, dome switch 210 may be formed from rubber or another suitable elastomer. As discussed herein, keycap 202 may be compressed by a user input, and dome switch 210 in turn may be compressed, such that a portion of dome switch 210 contacts single membrane sheet 208 to form an electrical connection and/or input within electronic device 100.

As shown in FIG. 2, single membrane sheet 208 (including dome switch 210) may be affixed or adhered directly to PCB 204. In a non-limiting example, single membrane sheet 208, having a substantially similar geometry or surface area as PCB 204, may substantially cover PCB 204 by being affixed or adhered to PCB 204 using an adhesive layer 212. As shown in FIG. 2, adhesive layer 212 may be positioned between single membrane sheet 208 to affix and/or directly couple single membrane sheet 208 to PCB 204. In the non-limiting example, single membrane sheet 208, including dome switch 210, may be affixed or adhered directly to PCB 204 using an anisotropic conductive film that is adhered and/or bonded directly to single membrane sheet 208 and PCB 204. Anisotropic conductive film may electrically couple PCB 204 to single membrane sheet 208, and/or may provide an electrical conduit or intermediate electrical layer between PCB 204 and single membrane sheet 208, such that single membrane sheet 208 and PCB 204 are in electrical communication. As discussed herein, when dome switch 210 is actuated or compressed by keycap 202, an electrical circuit may be formed between single membrane sheet 208 and PCB 204 for providing an electrical signal and/or input to electronic device 100. In another non-limiting example, a pressure sensitive adhesive may be positioned between single membrane sheet 208 and PCB 204 for adhering single membrane sheet 208 directly to PCB 204.

Keyboard assembly 200 may also include a switch housing 218. As shown in FIG. 2, switch housing 218 may be positioned above PCB 204 and may substantially surround dome switch 210. In a non-limiting example, dome switch 210, affixed or coupled directly to single membrane sheet 208, may be positioned within an opening of switch housing 218, such that switch housing 218 may substantially surround and/or substantially seal done switch 210 within keyboard assembly 200. In the non-limiting example where membrane layer 207 is formed as single membrane sheet 208, switch housing 218 may be affixed or adhered directly to single membrane sheet 208. Switch housing 218 may be affixed or adhered directly to single membrane sheet 208 using housing adhesive layer 220. Switch housing 218 may be formed from a substantially rigid material and provide support to the various components of keyboard assembly 200, as well as protecting and/or sealing dome switch 210 within keyboard assembly 200. Additionally, and as discussed herein, the material of switch housing 218 may be optically transparent to distribute and/or disperse the light emitted by light source 206 through keyboard assembly 200.

Figure 4:
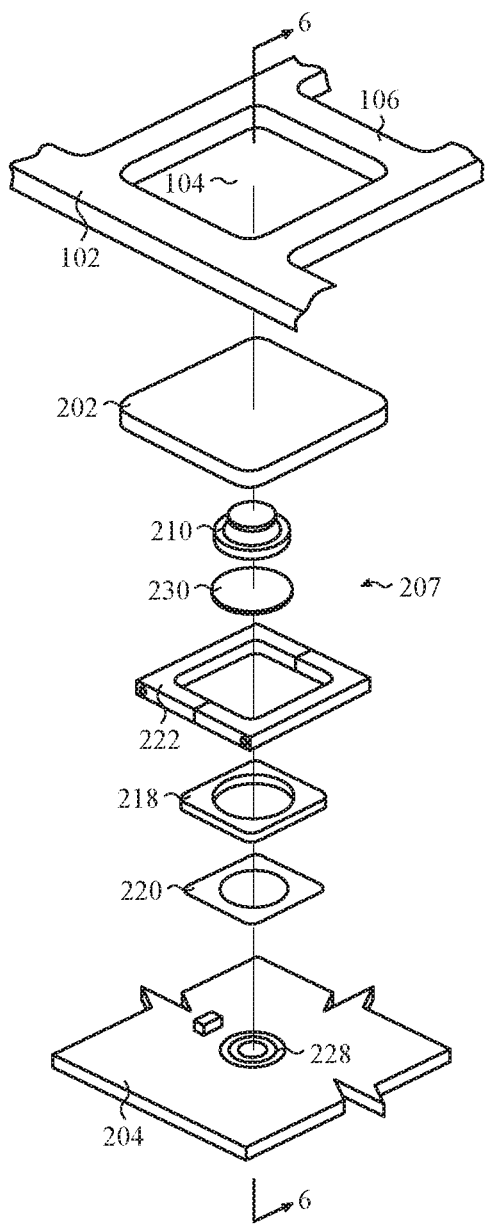
FIG. 4 depicts an illustrative exploded view of a key assembly of the keyboard assembly of FIG. 1.

A hinge mechanism 222 (as shown in FIG. 4) of keyboard assembly 200 may substantially surround switch housing 218. As shown in FIG. 2, switch housing 218 is positioned between and/or separates dome switch 210 coupled to single membrane sheet 208 and hinge mechanism 222. Hinge mechanism 222 may be positioned above PCB 204 and may be affixed within keyboard assembly 200 by being coupled to switch housing 218 and/or PCB 204. In a non-limiting example, hinge mechanism 222 may also be coupled to keycap 202 for providing support to keycap 202. Hinge mechanism 222, as shown in FIG. 2, may take the form of any suitable hinge mechanism 222 capable of moving keycap 202 from an uncompressed state to a compressed state, including but not limited to: a butterfly or V-shaped hinge mechanism, a scissor hinge mechanism, a telescoping hinge mechanism or a sliding hinge mechanism.

As shown in FIGS. 1 and 2, keycap 202 may protrude or extend at least partially through opening 104 formed in top case 102, and may be interacted with by a user of electronic device 100. Additionally, the various keycaps 202 of keyboard assembly 200 may be substantially surrounded and/or separated by web 106 of top case 102 of electronic device 100. As discussed herein, when a user presses keycap 202, keycap 202 and dome switch 210 of keyboard assembly 200 move from an uncompressed state to a compressed state to form an electrical connection and/or signal within electronic device 100.

Figure 3:
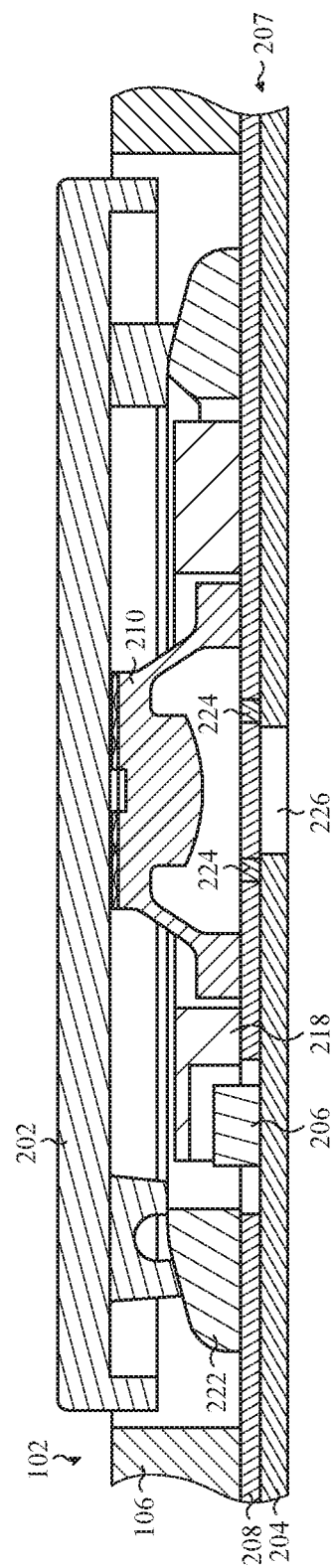
FIG. 3 depicts an illustrative cross-section view of the key assembly of FIG. 2 taken along line 3-3.

FIG. 3 shows a front cross-section view of keyboard assembly 200 of FIG. 2 in an uncompressed state. Some layers or components, for example adhesive layer 212 and housing adhesive layer 220, have been omitted for clarity. As shown in FIG. 3, light source 206 formed on PCB 204 may extend from PCB 204 into an opening formed in switch housing 218. In a non-limiting example where membrane layer 207 is formed as single membrane sheet 208 (as opposed to from multiple sheets and/or films and/or adhesives), light source 206 may extend through an opening formed in single membrane sheet 208, and into the opening of switch housing 218 configured to receive light source 206. By positioning light source 206 substantially within switch housing 218, light source 206 may illuminate keycap 202 of keyboard assembly 200.

Single membrane sheet 208 of keyboard assembly 200 may also include two electrical traces or contacts 224. As shown in FIG. 3, electrical contacts 224 may be positioned below dome switch 210 and may be coupled to and/or embedded directly within single membrane sheet 208. Electrical contacts 224 of single membrane sheet 208 may be in electrical contact and/or may be in electrical communication with contacts or traces formed within and/or on PCB 204 (not shown). In a non-limiting example, when keycap 202 and/or dome switch 210 are in a compressed state, a portion of dome switch 210 may move toward single membrane sheet 208 and may contact electrical contacts 224 formed in single membrane sheet 208. When the dome switch 210 contacts the electrical contacts 224, it completes an electrical circuit between single membrane sheet 208 and PCB 204, and an electrical input or other signal is provided to electronic device 100.

As shown in FIG. 3, PCB 204 may have an aperture 226 formed therein. In a non-limiting example, aperture 226 may be formed in PCB 204, and may be centrally aligned with dome switch 210 coupled directly to single membrane sheet 208. When dome switch 210 is compressed by keycap 202 and/or in a compressed state, and contacts electrical contacts 224 to complete an electrical circuit within keyboard assembly 200, dome switch 210 may also deflect single membrane sheet 208. As a result, a portion of single membrane sheet 208 may deflect into aperture 226 of PCB 204. In allowing a portion of single membrane sheet 208 to deflect into aperture 226 of PCB 204, the tactile feel to a user compressing keycap 202 may have a less severe or sudden end point. Additionally, by allowing a portion of single membrane sheet 208 to deflect into aperture 226 of PCB 204, dome switch 210 and/or keycap 202 may have a greater distance of travel between an uncompressed and compressed state, without requiring additional height, thickness and/or z-space for keyboard assembly 200.

FIG. 4 depicts an illustrative exploded view of keyboard assembly 200 including distinct components, layers and/or features. The distinct components, layers and/or features are identified in detail below. However, it is understood that similarly named components or similarly numbered components may function in a substantially similar fashion, may include similar materials and/or may include similar interactions with other components. Redundant explanation of these components has been omitted for clarity.

As shown in FIG. 4, PCB 204 may include conductive pads 228. In a non-limiting example, PCB 204 may include a plurality of conductive pads 228, where each conductive pad 228 corresponds to a single key assembly and/or keycap 202 of keyboard assembly 200. Additionally, and as discussed herein, conductive pad 228 may correspond to and/or may be in direct contact with individual membrane pads 230 forming membrane layer 207 of keyboard assembly 200. Conductive pads 228 may form an electrical conduit and/or may electrically couple membrane layer 207 (e.g., membrane pad 230) to PCB 204 to provide electrical input and/or signals to electronic device 100, when keycap 202 and/or dome switch 210 is compressed, as discussed herein.

In keyboard assembly 200 shown in FIG. 4, membrane layer 207 may be formed from membrane pad 230. In a non-limiting example, membrane pad 230, similar to conductive pad 228 may be specific to an individual keycap 202 of keyboard assembly 200. As such, membrane layer 207 may not be a single membrane pad, similar to that of single membrane sheet 208 of FIGS. 2 and 3, but rather, membrane layer 207 may be formed from a group of membrane pads 230, where each membrane pad 230 corresponds to an individual keycap 202 of keyboard assembly 200. Membrane pad 230 may be adhered directly to conductive pad 228 of PCB 204 in similar fashions as discussed herein with respect to single membrane sheet 208 and PCB 204 (see, FIG. 2). Although not shown in FIG. 4, it is understood that adhesive layer 212 may be positioned between membrane pad 230 and PCB 204 to affix adhere membrane pad 230 directly to conductive pads 228 of PCB 204. Additionally, dome switch 210 may be coupled directly to membrane pad 230 in similar fashions as discussed herein with respect to dome switch 210 and single membrane sheet 208 (see, FIG. 2). Portions of membrane pad 230 may be formed from a substantially flexible, electrically conductive material including, but not limited to an indium tin oxide (no) layer. Additionally, and as discussed herein in detail, distinct portions of membrane pad 230 that may contact conductive pad 228 may be formed from various materials having distinct physical and/or electrically conductive properties.

As shown in FIG. 4, membrane pad 230 corresponding to conductive pad 228 and a single keycap 202 of keyboard assembly 200 may be substantially surrounded by switch housing 218. In a non-limiting example, the perimeter of membrane pad 230 may not extend beyond the opening formed within switch housing 218. As such, switch housing 218 may substantially surround and seal dome switch 210 as well as membrane pad 230. Additionally, because membrane pad 230 does not extend below switch housing 218, switch housing 218 may be adhered directly to PCB 204 via housing adhesive layer 220.

Figure 5A:
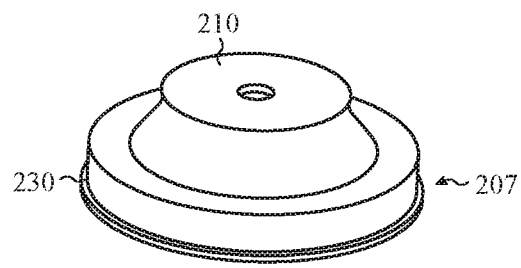
FIG. 5A depicts an illustrative top view of the dome switch and the membrane pad of the key assembly of FIG. 4.
Figure 5B:
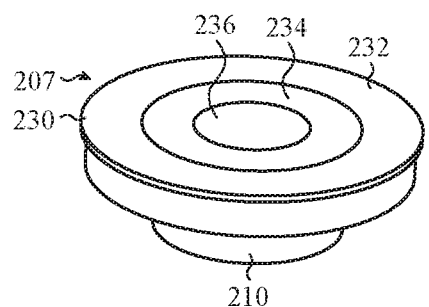
FIG. 5B depicts an illustrative bottom view of the dome switch and the membrane pad of the key assembly of FIG. 4.

FIGS. 5A and 5B depict various views of dome switch 210 and membrane layer 207 formed as membrane pad 230. As shown in FIGS. 5A and 5B, and as discussed herein, dome switch 210 may be adhered directly to membrane pad 230. Dome switch 210 may be adhered directly to membrane pad 230 prior to installing dome switch 210 and membrane pad 230 within keyboard assembly 200 to improve the assembly process and/or to avoid assembly and/or functionality defects within keyboard assembly 200. That is, dome switch 210 may be adhered directly to membrane pad 230 prior to adhering membrane pad 230 directly to conductive pad 228 and/or PCB 204 to ease the assembly process and/or ensure dome switch 210 is properly aligned on membrane pad 230 before aligning and coupling membrane pad 230 to PCB 204.

FIG. 5B depicts a bottom view of dome switch 210 and membrane pad 230. In a non-limiting example, membrane pad 230 may be formed from an outer conductive ring 232, an intermediate conductive spacer 234, and an inner conductive ring 236. Each of outer conductive ring 232, intermediate conductive spacer 234 and inner conductive ring 236 may be concentric with one another, such that intermediate conductive spacer 234 is concentric with and surrounded by outer conductive ring 232, and inner conductive ring 236 is concentric with and surrounded by intermediate conductive spacer 234 and/or outer conductive ring 232.

Outer conductive ring 232 and inner conductive ring 236 may be formed from substantially similar material (e.g., indium tin oxide (ITO)) and/or may include similar physical (e.g., flexible) and electrical properties. Intermediate conductive spacer 234 may be formed from a distinct material than outer conductive ring 232 and/or inner conductive ring 236. In a non-limiting example, intermediate conductive spacer 234 may be formed from an adhesive layer having electrically conductive properties. In the non-limiting example where intermediate conductive spacer 234 is formed from an electrically conductive adhesive layer, intermediate conductive spacer 234 may aid in adhering membrane pad 230 to PCB 204 and/or conductive pad 228, as well as forming an electrical conduit and/or electrically communicating membrane pad 230 to PCB 204, as discussed herein. In another non-limiting example, intermediate conductive spacer 234 may be formed from a substantially flexible material having electrical properties. This material may be distinct from or substantially similar to the material forming outer conductive ring 232 and/or inner conductive ring 236.

Intermediate conductive spacer 234 and/or inner conductive ring 236 of membrane pad 230 may be raised above outer conductive ring 232. That is, in a non-limiting example, intermediate conductive spacer 234 and/or inner conductive ring 236 may not be in planar alignment with outer conductive ring 232 of membrane pad 230. As such, and as discussed herein, when membrane pad 230 is coupled to conductive pad 228, only inner conductive ring 236 may contact conductive pad 228, while intermediate conductive spacer 234 and/or inner conductive ring 236 are positioned above and/or spaced apart from conductive pad 228. Additionally as discussed herein, when keycap 202 and/or dome switch 210 are compressed by a user's input, intermediate conductive spacer 234 and/or inner conductive ring 236 may be deflected to contact conductive pad 228 of PCB 204 to form an electrical input or signal within electronic device 100.

Figure 6:
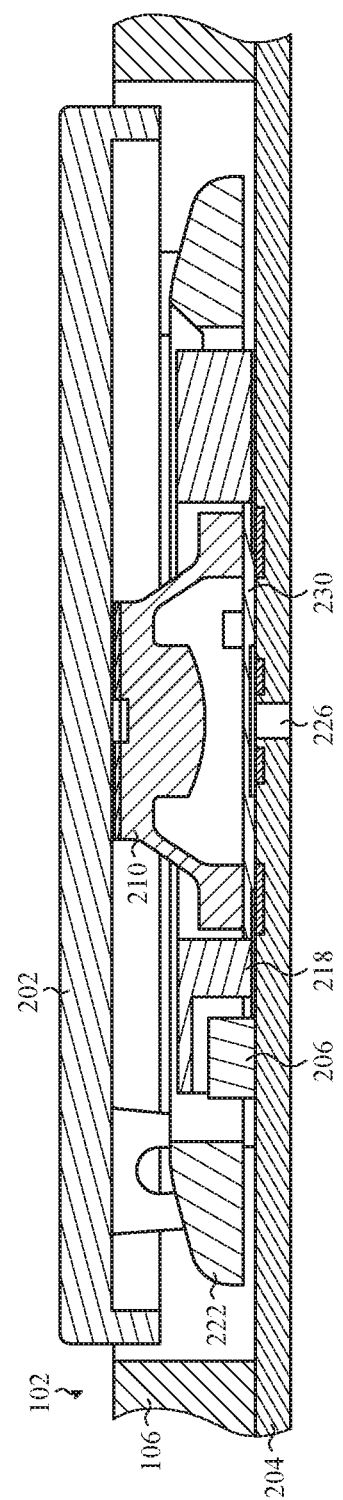
FIG. 6 depicts an illustrative cross-section view of the key assembly of FIG. 4 taken along line 6-6 of FIG. 4.

FIG. 6 shows a front cross-section view of keyboard assembly 200 of FIG. 4 in an uncompressed state. As shown in FIG. 6, light source 206 formed on PCB 204 may extend from PCB 204 into an opening formed in switch housing 218. In the non-limiting example where membrane layer 207 is formed as membrane pad 230, light source 206 may extend from PCB 204 into switch housing 218. That is, and distinct from FIG. 3, membrane pad 230 does not extend beyond or below switch housing 218, and as a result, light source 206 may not pass through membrane pad 230, but rather extends directly from PCB 204 to the opening of switch housing 218 configured to receive light source 206.

Figure 7:
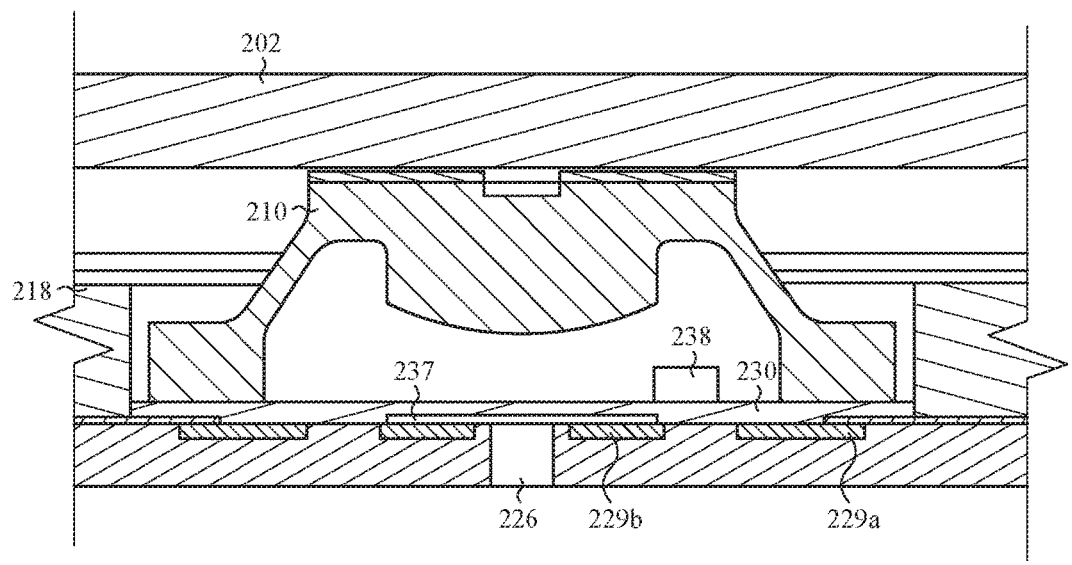
FIG. 7 depicts an illustrative enlarged cross-section view of a portion of the key assembly of FIG. 6.

As shown in FIG. 7, conductive pad 228 may include distinct conductive portions 229a, 229b. In a non-limiting example shown in FIGS. 6 and 7, conductive pad 228 may include an outer conductive portion 229a, and an inner conductive portion 229b surrounded by outer conductive portion 229a. Additionally in the non-limiting example, inner conductive portion 229b may be spaced apart from and/or may not be in contact with outer conductive portion 229a of conductive pad 228. Outer conductive portion 229a and inner conductive portion 229b may be electrical contacts or traces for PCB 204 for forming an electrical input or signal within electronic device 100. As discussed herein, outer conductive portion 229a and inner conductive portion 229b of conductive pad 228 may contact the various portions (e.g., outer conductive ring 232, intermediate conductive spacer 234, and inner conductive ring 236) of membrane pad 230 to form an electrical input or signal within electronic device 100, when keycap 202 and/or dome switch 210 is compressed.

As shown in FIG. 7, when keycap 202 and/or dome switch 210 of keyboard assembly 200 is in an uncompressed state, a gap or space 237 may exist between membrane pad 230 and conductive pad 228. The space 237 may specifically be formed between inner conductive portion 229b of conductive pad 228 and intermediate conductive spacer 234 and/or inner conductive ring 236 of membrane pad 230 when dome switch 210 is uncompressed. As discussed herein with respect to FIG. 5B, space 237 may exist between conductive pad 228 and portions of membrane pad 230 as a result of intermediate conductive spacer 234 and/or inner conductive ring 236 being recessed within and/or being out of planar alignment with outer conductive ring 232 of membrane pad 230. As shown in FIG. 7, outer conductive ring 232 of membrane pad 230 may be in contact with outer conductive portion 229a of conductive pad 228 formed on PCB 204.

However, in a compressed state of keycap 202 and/or dome switch 210 of keyboard assembly 200, space 237 may be closed when a portion of dome switch 210 contacts membrane pad 230, and subsequently deflects membrane pad 230 into conductive pad 228. That is, when dome switch 210 is compressed by keycap 202, dome switch 210 may contact, deflect and/or flex membrane pad 230 toward PCB 204 to contact conductive pad 228 and/or substantially close or fill space 237 formed between membrane pad 230 and conductive pad 228. Because of the deflection of membrane pad 230, intermediate conductive spacer 234 and/or inner conductive ring 236 may contact inner conductive portion 229b of conductive pad 228. When intermediate conductive spacer 234 and/or inner conductive ring 236 contacts inner conductive portion 229b of conductive pad 228, the various portions of membrane pad 230 and conductive pad 228 may be in electrical contact and may complete an electrical circuit within keyboard assembly 200.

Figure 8:
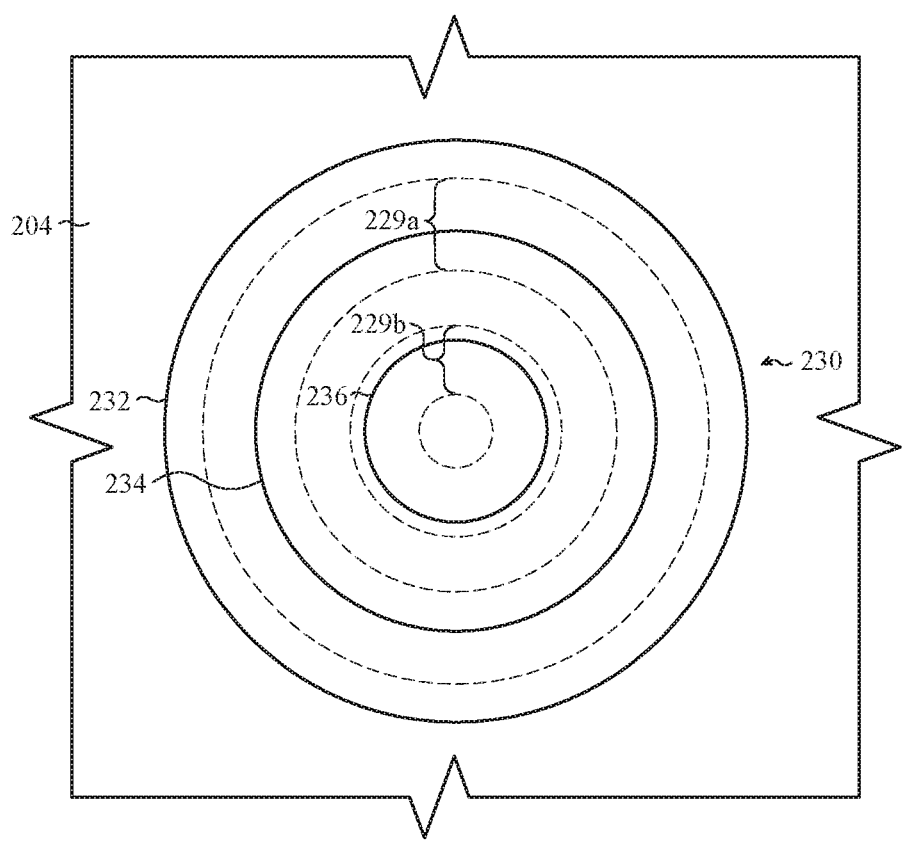
FIG. 8 depicts an illustrative top view of the membrane pad contacting the conductive pad of the key assembly of FIG. 4.

FIG. 8 depicts a top view of membrane pad 230 and conductive pad 228 (shown in phantom), and illustrates the geometric relationship of each portion of membrane pad 230 with respect to conductive pad 228. In a non-limiting example shown in FIG. 8, outer conductive ring 232 of membrane pad 230 may overlap and/or cover a portion of outer conductive portion 229a of conductive pad 228, and inner conductive ring 236 of membrane pad 230 may overlap and/or cover a portion of inner conductive portion 229b of conductive pad 228. Additionally in the non-limiting example, intermediate conductive spacer 234 may overlap and/or cover a portion of both outer conductive portion 229a and inner conductive portion 229b of conductive pad 228.

As discussed herein, when dome switch 210 is in an uncompressed state, only outer conductive ring 232 of membrane pad 230 may contact outer conductive portion 229a of conductive pad 228. However, in a compressed state of dome switch 210, inner conductive ring 236 of membrane pad 230 may contact inner conductive portion 229b of conductive pad 228. Additionally, when dome switch 210 is compressed, intermediate conductive spacer 234 may contact both outer conductive portion 229a and inner conductive portion 229b of conductive pad 228, and may bridge the electrical gap between the various portions of membrane pad 230 and conductive pad 228.

Briefly returning to FIG. 7, dome switch 210 may include a venting hole 238. Venting hole 238 may expel air from underneath dome switch 210 when dome switch 210 is compressed by keycap 202. By expelling air from the space between dome switch 210 and membrane layer 207, the air pressure under dome switch 210 may be maintained within keyboard assembly 200.

Figure 9:
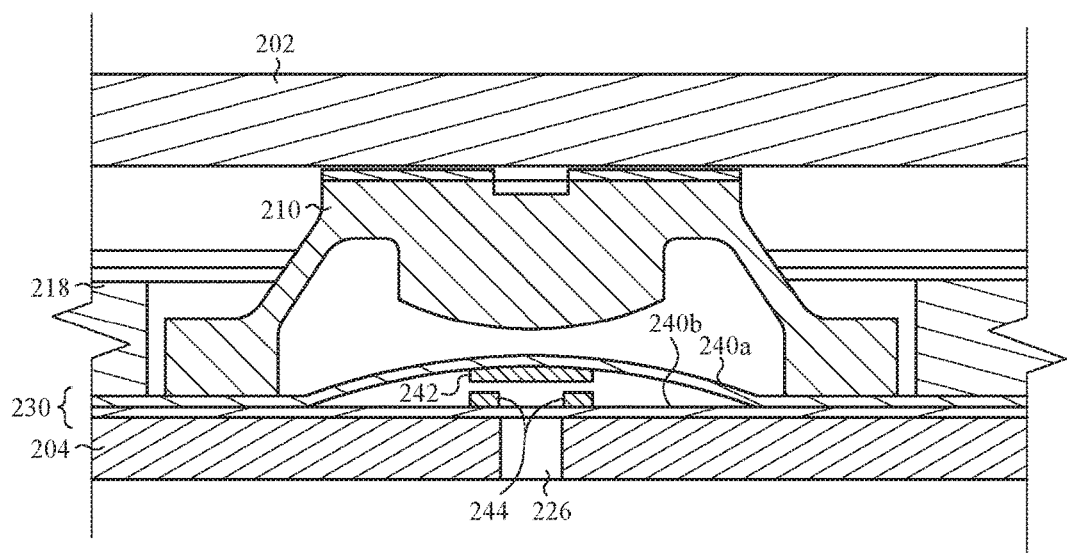
FIG. 9 depicts an illustrative enlarged cross-section view of a portion of the key assembly of FIG. 6.

FIG. 9 depicts another non-limiting example of membrane pad 230. In the non-limiting example, membrane pad 230 may include an upper portion 240a and a lower portion 240b positioned opposite upper portion 240a. As shown in FIG. 9, lower portion 240b may be positioned directly adjacent to and/or may be directly adhered to PCB 204. Upper portion 240a is positioned above lower portion 240b and extends toward dome switch 210. Additionally as shown in FIG. 9, upper portion 240a and lower portion 240b may be sealed on a periphery or perimeter of membrane pad 230. As a result, the space formed between upper portion 240a and lower portion 240b, and the electrical contacts positioned therein, as discussed below, may be sealed and/or protected from contaminants.

As shown in FIG. 9, upper portion 240a may include a first electrical contact 242, and lower portion 240b may include two distinct electrical contacts 244. In an uncompressed state of dome switch 210, first electrical contact 242 and two distinct electrical contacts 244 may be spaced apart from each other, as shown in FIG. 9. However, when keycap 202 and/or dome switch 210 is compressed, first electrical contact 242 and/or upper portion 240a of membrane pad 230 may move toward distinct electrical contacts 244 and/or lower portion 240b until first electrical contact 242 contacts distinct electrical contacts 244. When first electrical contact 242 contacts distinct electrical contacts 244, an electrical circuit is completed within membrane pad 230, and consequently an electrical circuit is completed with PCB 204 that is in electrical communication with the electrical contacts 242, 244 of membrane pad 230 via contacts or traces formed on PCB 204. As similarly discussed herein, the completion of the electrical circuit between membrane pad 230 and PCB 204 provides an electrical input and/or signal to electronic device 100.

Figure 10:
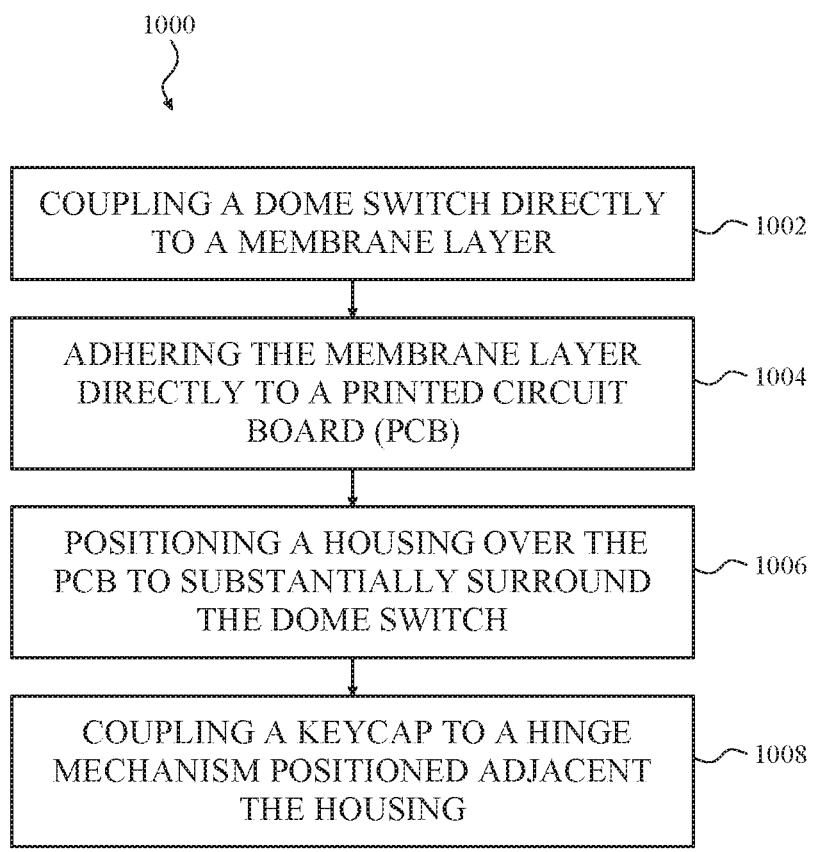
FIG. 10 depicts a flow chart of an example process for assembling a keyboard for an electronic device.

FIG. 10 depicts an example process for assembling a keyboard. Specifically, FIG. 10 is a flowchart depicting one example process 1000 for assembling a keyboard for an electronic device. In some cases, the process may be used to form one of the various embodiments of the keyboard assemblies, as discussed above with respect to FIGS. 2-9.

In operation 1002, a dome switch may be directly coupled to a membrane layer of the keyboard assembly. The coupling of the dome switch directly to the membrane layer may include adhering or otherwise affixing the dome switch to the membrane layer, or laminating the dome switch to the membrane layer. When the dome switch is adhered to the membrane layer, the adhering may also include depositing ultraviolet (UV) glue between the dome switch and the membrane layer, and subsequently curing the UV glue deposited between the dome switch and the membrane layer.

The membrane layer of the keyboard assembly may take the form of various embodiments, including a single membrane sheet that may substantially cover a printed circuit board (PCB) of the keyboard assembly. When the membrane layer is configured as a single membrane sheet, the dome switch may be affixed directly to the single membrane sheet. The membrane layer may also take the form of a membrane pad that may correspond to the dome switch. When the membrane layer is configured as a membrane pad, the dome switch may be affixed directly to the membrane pad.

In operation 1004, the membrane layer may be directly adhered to a PCB of the keyboard assembly. Specifically, the membrane layer, and the dome switch coupled to the membrane layer, may be adhered directly to the PCB. In a non-limiting example, the adhering of the membrane layer to the PCB may also include bonding an anisotropic conductive film between the membrane layer and the PCB, to bond the membrane layer to the PCB.

In operation 1006, a switch housing may be positioned over the PCB. Specifically, the housing may be positioned over the PCB and/or adjacent the PCB and/or the membrane layer. The housing positioned over the PCB may substantially surround the dome switch coupled directly to the membrane layer. The operation of positioning the switch housing over the PCB may also include adhering (or otherwise affixing) the housing to the PCB and/or membrane layer. Specifically, where the membrane layer is configured as a single membrane sheet, the housing may be adhered directly to the single membrane sheet. Where the membrane layer is configured as a membrane pad, the housing may be adhered directly to the PCB. The housing adhered directly to the PCB may substantially surround the membrane pad as well as the dome switch.

In operation 1008, a keycap may be coupled to a hinge mechanism. The hinge mechanism may be positioned adjacent to and/or may substantially surround the housing. Additionally, the keycap may be positioned above the dome switch coupled directly to the membrane layer, and the housing as well. The keycap may be releasably coupled to the hinge mechanism, which may be configured to move the keycap to compress the dome switch to form an electrical connection within the keyboard assembly.

In a keyboard assembly, a dome switch may be disposed, coupled and/or affixed directly to a membrane layer of the keyboard assembly stack-up. Additionally, the membrane layer may be adhered directly to a printed circuit board (PCB) of the keyboard assembly stack-up. When compressed, the dome switch, membrane layer and PCB may all be in electrical connection and/or may form an electrical signal (e.g., input) for the keyboard assembly and/or electronic device utilizing the keyboard assembly. In one embodiment, the membrane layer may be a single component that substantially covers and/or is disposed over the PCB layer, and the various dome switches of the keyboard assembly may be disposed, coupled and/or affixed directly to distinct portions of the single membrane layer. In another embodiment, each individual dome switch for each individual key assembly of the keyboard may be disposed, coupled and/or affixed directly to a corresponding membrane pad. The membrane pad may be adhered to a PCB layer or a corresponding conductive pad of the keyboard assembly stack-up. By affixing the dome switch directly to the membrane layer and/or the membrane pad, and affixing the membrane layer/pad to the PCB, the overall size and/or thickness of the stack-up for the keyboard assembly is reduced. Additionally, by coupling the dome switch directly to the membrane layer/pad, the dome switch may be more easily implemented, secured and/or installed in the stack-up of the keyboard assembly, which may reduce assembly time for the keyboard assembly.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. An electronic device comprising:
   a casing; and
   a keyboard assembly housed at least partially within the casing, the keyboard assembly comprising:
     a printed circuit board (PCB) positioned within the casing;
     a membrane layer attached to the PCB;
     a switch housing affixed directly to the membrane layer or to the PCB; and
     a dome switch coupled directly to the membrane layer.

2. The electronic device of claim 1, wherein an anisotropic conductive film is bonded to the PCB and the membrane layer is attached to the PCB by the anisotropic conductive film.

3. The electronic device of claim 1, wherein a film electrically couples the PCB and the membrane layer.

4. The electronic device of claim 1, wherein the membrane layer comprises one of:
   a single membrane sheet substantially covering the PCB; or
   a group of membrane pads attached to the PCB.

5. The electronic device of claim 1, wherein the membrane layer is formed from a substantially flexible, electrically conductive material.

6. A keyboard assembly comprising:
   a printed circuit board (PCB);
   a single membrane sheet substantially covering the PCB;
   a conductive adhesive bonding the single membrane sheet to the PCB; and
   a group of dome switches attached to the single membrane sheet, wherein the single membrane sheet comprises an electrical contact in electrical communication with the PCB.

7. The keyboard assembly of claim 6, wherein the conductive adhesive is a pressure sensitive adhesive.

8. The keyboard assembly of claim 6, wherein the group of dome switches is adhered to the single membrane sheet.

9. The keyboard assembly of claim 6, wherein:
   the electrical contact comprises a group of electrical contacts; and
   a set of two distinct electrical contacts of the group of electrical contacts are formed below each dome switch of the group of dome switches.

10. The keyboard assembly of claim 9, wherein a single dome switch of the group of dome switches contacts one of the set of two distinct electrical contacts when the single dome switch is in a compressed state.

11. A keyboard assembly comprising:
    a printed circuit board (PCB) including a group of conductive pads;
    a group of membrane pads, each of the group of membrane pads including a conductive spacer that is adhered directly to a corresponding one of the group of conductive pads; and
    a group of dome switches, each of the group of dome switches coupled directly to a corresponding one of the group of membrane pads.

12. The keyboard assembly of claim 11, wherein:
    each of the group of membrane pads comprises:
      an outer conductive ring; and
      an inner conductive ring within the outer conductive ring; and
    the conductive spacer separates, and is concentric with, the outer conductive ring and the inner conductive ring.

13. The keyboard assembly of claim 12, wherein each of the group of conductive pads comprises:
    an outer conductive portion in contact with the outer conductive ring of a corresponding one of the group of membrane pads; and
    an inner conductive portion spaced apart from and surrounded by the outer conductive portion, the inner conductive portion separated from the inner conductive ring and the conductive spacer of the membrane pad when a corresponding dome switch of the group of dome switches is in an uncompressed state.

14. The keyboard assembly of claim 13, wherein the conductive spacer of the membrane pad is in electrical communication with the outer conductive portion and the inner conductive portion of the conductive pad when the corresponding dome switch is in a compressed state.

15. The keyboard assembly of claim 11, wherein each of the group of membrane pads further comprises:
    an upper portion comprising a first electrical contact; and
    a lower portion comprising two distinct electrical contacts; wherein
    the lower portion is spaced apart from the upper portion when a corresponding dome switch of the group of dome switches is in an uncompressed state.

16. The keyboard assembly of claim 15, wherein the first electrical contact of the upper portion is displaced toward and contacts the two distinct electrical contacts of the lower portion when the corresponding dome switch is compressed.

17. The keyboard assembly of claim 15, wherein each upper portion is sealed to each corresponding lower portion at a perimeter of each of the group of membrane pads.

* * * * *